United States Patent
Jakubiak et al.

(10) Patent No.: US 8,306,328 B2
(45) Date of Patent: Nov. 6, 2012

(54) METHOD FOR CONVERTING OUTLINE CHARACTERS TO STYLIZED STROKE CHARACTERS

(75) Inventors: Elena J. Jakubiak, Arlington, MA (US); Ronald N. Perry, Cambridge, MA (US); Sarah F. Frisken, Cambridge, MA (US)

(73) Assignee: Mitsubishi Electric Research Laboratories, Cambridge, MA (US)

( * ) Notice: Subject to any disclaimer, the term of this patent is extended or adjusted under 35 U.S.C. 154(b) by 956 days.

(21) Appl. No.: 12/359,819

(22) Filed: Jan. 26, 2009

(65) Prior Publication Data

US 2010/0189362 A1 Jul. 29, 2010

(51) Int. Cl.
*G06K 9/00* (2006.01)

(52) U.S. Cl. .......................................................... 382/187

(58) Field of Classification Search ........... 382/181–231
See application file for complete search history.

(56) References Cited

U.S. PATENT DOCUMENTS

| | | | | |
|---|---|---|---|---|
| 5,509,091 A | * | 4/1996 | Aoki | 382/298 |
| 5,588,074 A | * | 12/1996 | Sugiyama | 382/209 |
| 6,173,075 B1 | * | 1/2001 | Collins | 382/203 |
| 7,227,993 B2 | * | 6/2007 | Xu et al. | 382/179 |
| 2004/0006749 A1 | | 1/2004 | Fux et al. | |

OTHER PUBLICATIONS

Elena J. Jakubiak et al."An Improved Representation for Stroke-based Fonts", SIGGRAPH 2006 Conference Abstracts and Applications.

\* cited by examiner

*Primary Examiner* — Alex Liew
(74) *Attorney, Agent, or Firm* — Dirk Brinkman; Gene Vinokur

(57) ABSTRACT

A method converts an outline character to a stylized stroke character by first identifying regions of the outline character, wherein each region is closed and disjoint. For each region, candidate locations for stroke bodies and terminals of the stylized stroke character are determined. The stroke bodies are then initialized and organized into a hierarchical tree stricture, and modified in an order of the hierarchical tree structure. End positions of the modified stroke bodies are then adjusted to match the outline character, and lastly, the terminals are selected for the adjusted stroke bodies.

13 Claims, 15 Drawing Sheets

600

METHOD FOR CONVERTING OUTLINE CHARACTERS TO STYLIZED STROKE CHARACTERS

RELATED PATENT APPLICATIONS

The following Patent Applications are all related, co-filed, and incorporated into each other: MERL-2081, U.S. Non-Provisional patent application Ser. No. 12/359,913, "Method for Improving Character Outlines Using Multiple Alignment Zones," filed by Perry et al. on Jan. 26, 2009; MERL-2082, U.S. Non-Provisional patent application Ser. No. 12/359,882, "Method for Improving Uniform Width Character Strokes Using Multiple Alignment Zones," filed by Perry et al. on Jan. 26, 2009; and MERL-2083 U.S. Non-Provisional patent application Ser. No. 12/359,819 "Method for Converting Outline Characters to Stylized Stroke Characters," filed by Jakubiak et al. on Jan. 26, 2009.

FIELD OF THE INVENTION

This invention relates generally to converting fonts, and more particularly to converting outline characters represented with outline fonts to stylized stroke characters represented with stylized stroke fonts (SSFs).

BACKGROUND OF THE INVENTION

The proliferation of processor and memory constrained devices, e.g., mobile telephones, personal digital assistants, car navigation systems, printers, cameras, and appliances, and the practice of transferring applets containing fonts, e.g., Flash and Java, on-demand over the Internet have demonstrated shortcomings of existing font representations.

These processor and memory constraints pose a particular problem when scripts include a large number of characters. Large high quality font sets require large amounts of memory and are slow to process. As shown in Table 1, Chinese, Japanese, and Korean (CJK) scripts contain many more characters than Latin scripts.

TABLE 1

| Number of Characters | Character Set |
| --- | --- |
| 224 | Latin-1 |
| 7,043 | Japanese (Kanji) |
| 7,580 | Simplified Chinese |
| 13,860 | Traditional Chinese |
| 17,142 | Korean |
| 18,267 | Traditional Chinese with Hong Kong Character Set |

FIG. 1A shows a Chinese character represented with a conventional expressive outline font. The outline font uses straight and curved line segments that form closed contours. Outline fonts are difficult to support on memory and processor constrained devices, Conventional methods that are used to render high quality outline characters require considerable CPU resources and the memory footprint of these fonts is large.

Bitmap representations also require too much memory on memory constrained devices. Furthermore, monochromatic bitmaps are not anti-aliased, bitmaps are not scalable, and hand tuning bitmaps is very labor intensive.

To optimize memory usage, uniform width stroke fonts can be used. These fonts typically group sets of strokes, a.k.a. radicals or graphemes, which are commonly repeated in Chinese characters throughout a font, as a single simple shape that is then reused across characters.

FIG. 1B shows a Chinese character represented with a conventional uniform width stroke font, which requires significantly less memory (~250 KB), but fails to reflect the rich brushed style of Chinese writing, and therefore lacks cultural acceptance.

Stylized Stroke Fonts (SSFs) are enhanced stroke-based fonts whose strokes have variable thickness and stylistic stroke ends—see "An Improved Representation for Stroke-based Fonts", SIGGRAPH 2006 Conference Abstracts and Applications, Elena J. Jakubiak, Ronald N. Perry, and Sarah F. Frisken. SSFs employ a modular structure that leverages the repetition of shape within a font, enabling SSFs to match the expressiveness of outline fonts with a memory footprint comparable to current uniform width stroke fonts.

In order for SSFs to be a viable alternative to outline fonts, a collection of SSFs is needed that matches the variety offered by outline fonts. Unfortunately, creating a single SSF CJK font from scratch can take man-years of work. Consequently, there is a need for a method for automatically converting CJK glyphs from conventional outline representations (e.g., TrueType fonts) to SSFs.

An effective method for converting CJK outline fonts to stylized stroke fonts (SSFs) must require minimal human input, e.g., to tune parameters or edit failed conversions, and must be able to automatically detect conversion failures.

Moreover, the conversion process needs to be accurate enough that the time to correct conversion failures is significantly less than the time to create the SSF from scratch. It is an object of the invention to convert an outline font to an SSF automatically, and to provide editing and diagnostic tools that enable a font designer to quickly correct any poorly converted characters.

Prior art approaches for creating CJK fonts and reducing memory requirements include creating characters from core components, using parametric descriptions of characters, exploiting repetition of shapes to compress existing outline fonts, and designing radicalized uniform width stroke fonts.

A core set of about ten basic strokes are used to write all Chinese characters. Groups of these basic strokes are repeatedly used across many characters. Consequently, one approach for streamlining font creation and reducing memory requirements is to create fonts from a basic set of strokes or stroke groups. However, this constructive approach lacks the ability to represent important style subtleties due to a stroke's location within a character that ensure spatial balance and harmony, which are important for general cultural acceptance.

Another approach uses a set of geometric equations to mathematically define the parts of a stroke or character. These mathematically designed characters also have the potential to minimize creation time and to reduce memory requirements. However, font designers are specialized artists who design in terms of balance and harmony. To quote Donald Knuth, " . . . asking an artist to become enough of a mathematician to understand how to write a font with 60 parameters is too much," Knuth, 1986, The METAFONTbook, Addison-Wesley. Thus, outline fonts continue to prevail.

Attempts to compress outline representations have achieved on the order of 25% compression, but these savings are still insufficient. Therefore, font foundries have developed uniform width stroke fonts that are represented by simplified centerlines, as opposed to outlines, and that reuse stroke groups throughout the font. These fonts require significantly less memory (e.g., 250 KB for the standard Guojia Biaozhun (GB) 2312 Simplified Chinese character set with 7,663 characters), but the characters are simplistic and fail to reflect the rich brushed style of CJK characters.

SUMMARY OF THE INVENTION

The invention provides a method for automatically converting conventional outline characters to stylized stroke characters. The SSF stylized stroke-based representation is particularly suitable for Chinese, Japanese, and Korean (CJK) fonts, each of which can include more than 12,000 characters.

Conventional outline CJK fonts require at least 3 to 10 MB of memory. With the method according to the embodiments of the invention, the comparable SSF requires about 250 KB. Although similar memory reductions can be accomplished using uniform width stroke fonts, SSFs retain the superior stylistic characteristics of outline fonts.

The method for automatic conversion uses distance fields. The method initializes the SSF with a generic uniform width stroke font and then iteratively modifies each stylized stroke character to match the shape and style of the corresponding character of a target outline font. The method uses distance fields to measure the error between the stylized stroke character and its corresponding outline character, and to determine the required modifications for each iteration.

DETAILED DESCRIPTION OF THE PREFERRED EMBODIMENTS

Our invention provides a method for automatically converting a character represented with a conventional outline font (i.e., an outline character) to a character represented with a stylized stroke font (i.e., a stylized stroke character).

Character Structures

Figure 1B:
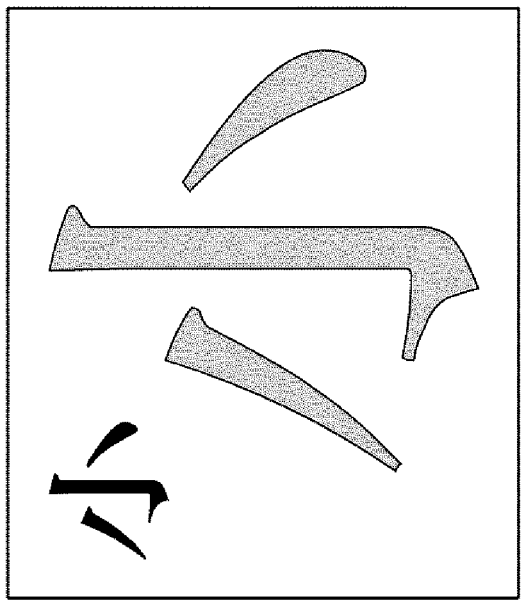
FIG. 1B is a Chinese character represented with a conventional uniform width stroke font.
Figure 1A:
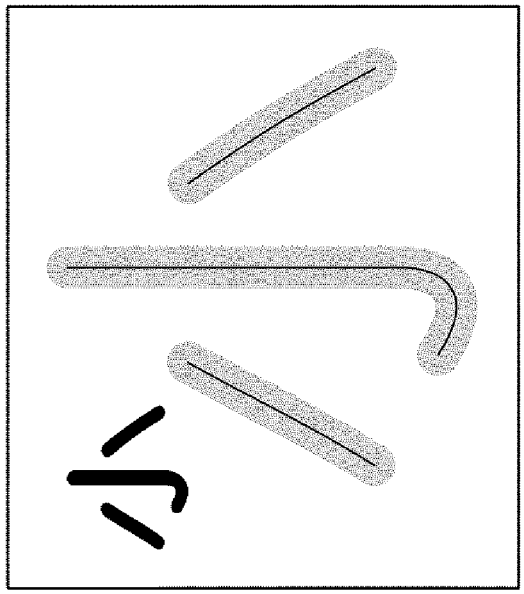
FIG. 1A is a Chinese character represented with a conventional outline font.
Figure 2:
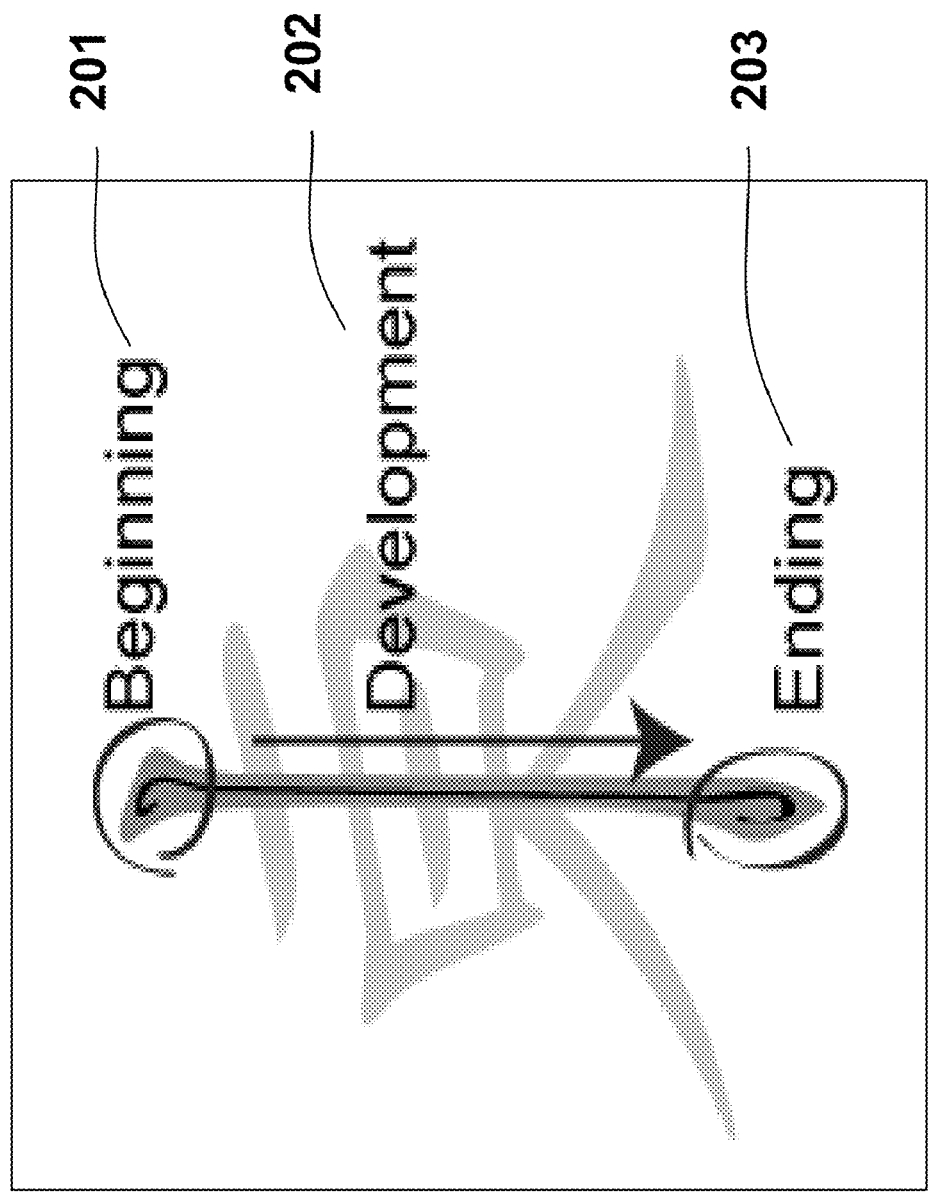
FIG. 2 is a Chinese character written as well-defined brush strokes.

As shown in FIG. 2, the style of a Chinese calligraphic stroke is largely defined by the three stages of a brush's movement along the paper—the beginning 201, the development 202, and the ending 203.

Figure 3:
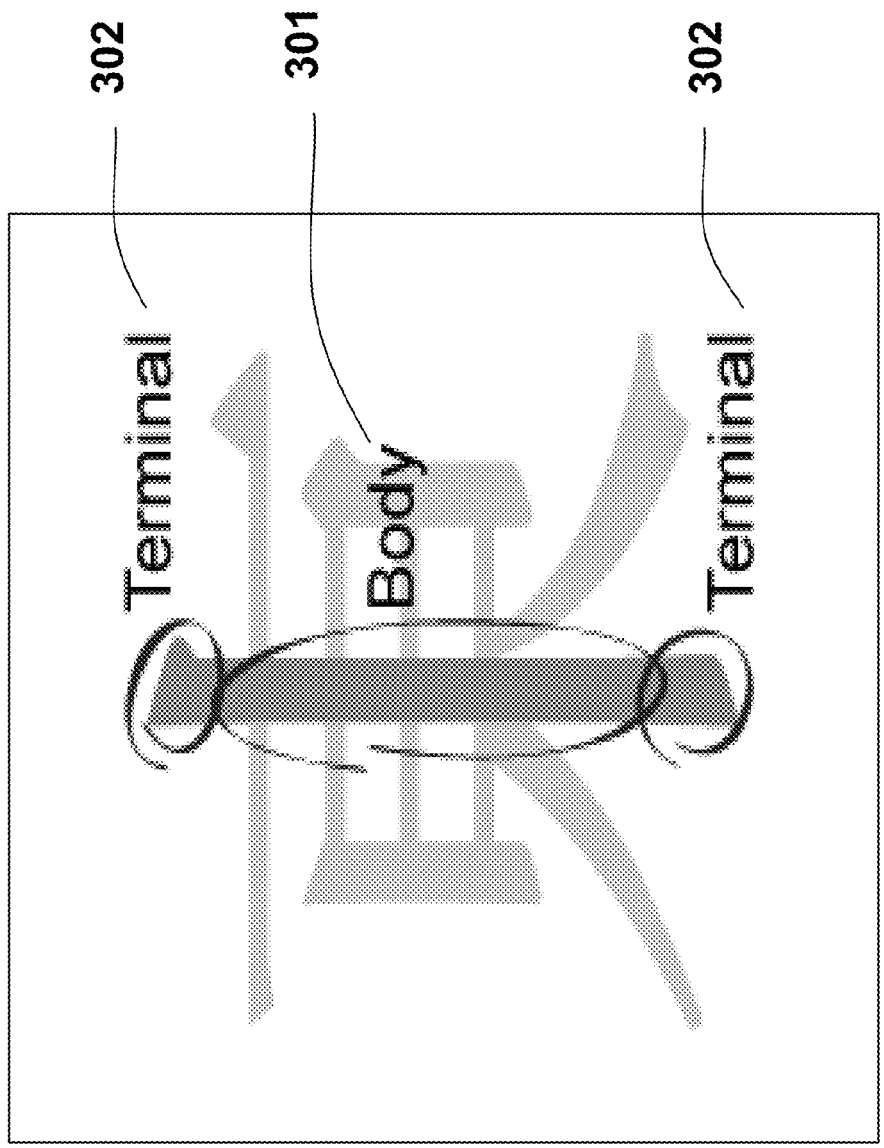
FIG. 3 is a Chinese character represented with a stylized stroke font according to embodiments of the invention.
Figure 4:
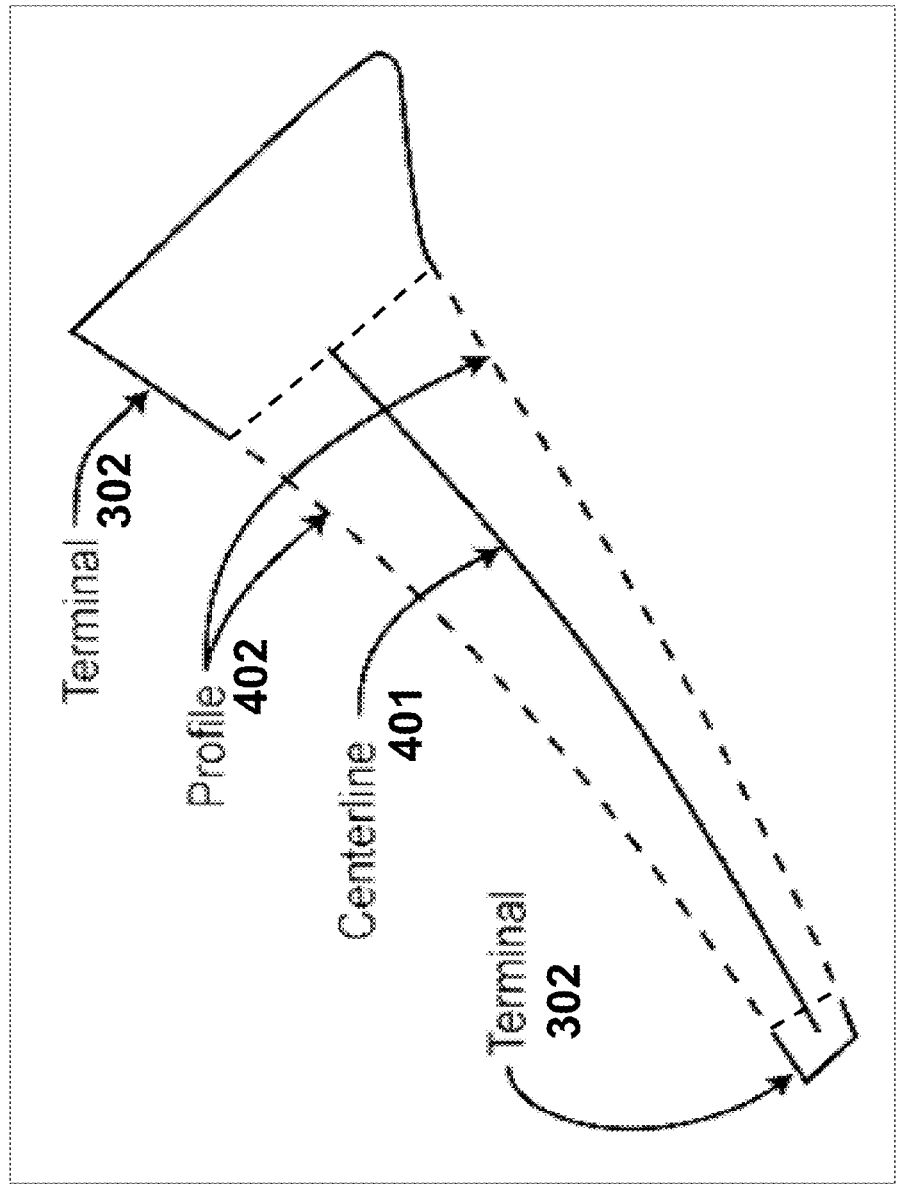
FIG. 4 is a stylized stroke according to embodiments of the invention.

As shown in FIGS. 3 and 4, the structure of an SSF stroke reflects this brush movement. The body 301 of an SSF stroke includes a centerline 401, which reflects the path of the brush along the development in FIG. 2, and a profile 402, which reflects the change in pressure of the brush along the development. The terminals 302 of the SSF stroke are a stylized representation of the beginning and ending of a brush's movement as the tip of the brush is placed on and removed from the page. Each centerline and terminal is represented by an open, piecewise continuous path of line segments and Bezier curves. The profile is represented by a single quadratic Bezier curve, which defines the perpendicular distance from the stroke centerline to both edges of the stroke.

We convert each outline character to an SSF representation. For a given outline character, our method uses the corresponding character from a uniform width stroke font to initialize the stylized stroke character, which is then iteratively modified to match the outline character. The SSF centerlines 401 are initialized using the paths of the uniform width stroke character. The SSF profiles 402 are initialized to a constant value, and the SSF strokes are initialized without terminals.

Figure 5C:
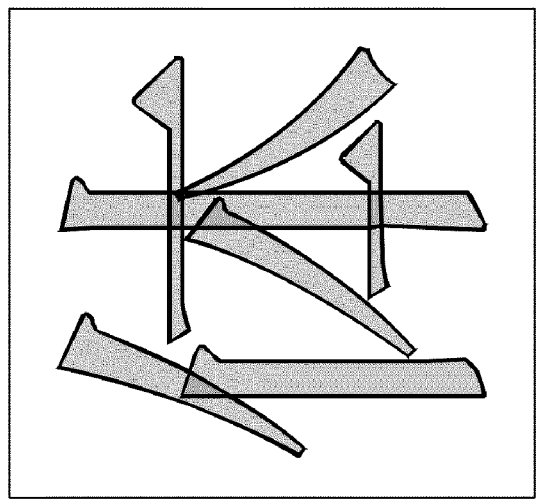
FIG. 5C is the character of FIG. 5A with a composite shape implied by the closed paths of FIG. 5B.
Figure 5B:
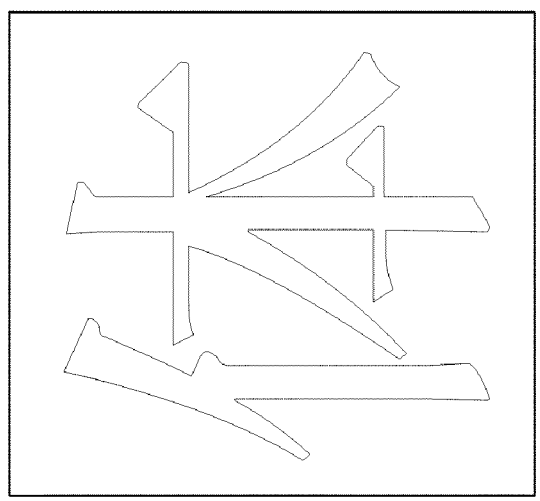
FIG. 5B is the character of FIG. 5A with closed paths according to embodiments of the invention.
Figure 5A:
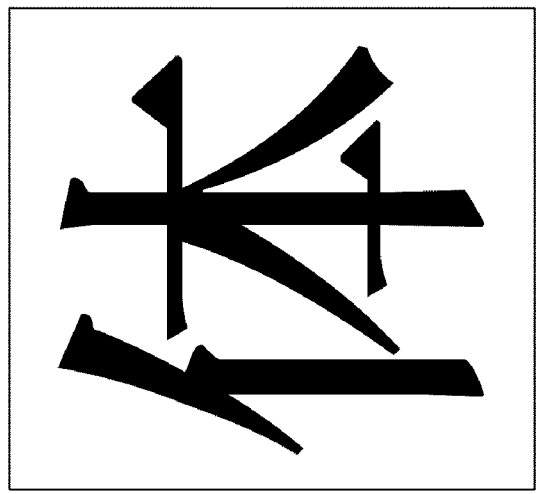
FIG. 5A is a Chinese character represented with an outline font to be converted to embodiments of the invention.

FIG. 5A shows an outline character that is represented by a closed path, as in FIG. 5B, which is the composite shape of the implied strokes in that character as in FIG. 5C. Thus, the outline character is really the composite shape of the strokes defining that character. The strokes of the stylized stroke character are actually modified to match the implied strokes of the outline character.

Distance Fields

Figure 6:
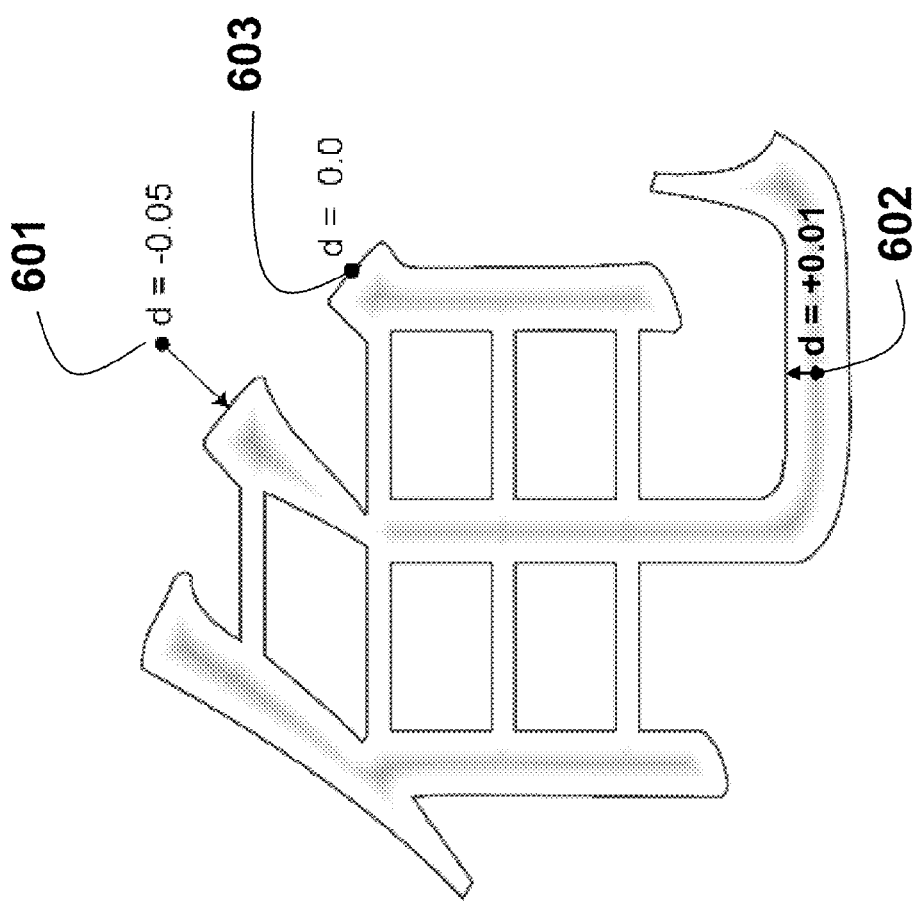
FIG. 6 is a Chinese character represented as a distance field according to embodiments of the invention.

As shown in FIG. 6 for a character 600, a distance field specifies, for any point in space, the distance from that point to the boundary of the character. Typically, an outside point 601 is negative, an inside point 602 is positive, and a point 603 on the outline is zero.

Because the distance field of the character provides the distance and direction to the boundary of the character for any point in space, distance fields are particularly useful for modifying the SSF strokes to match the implied strokes of the outline.

Figure 15:
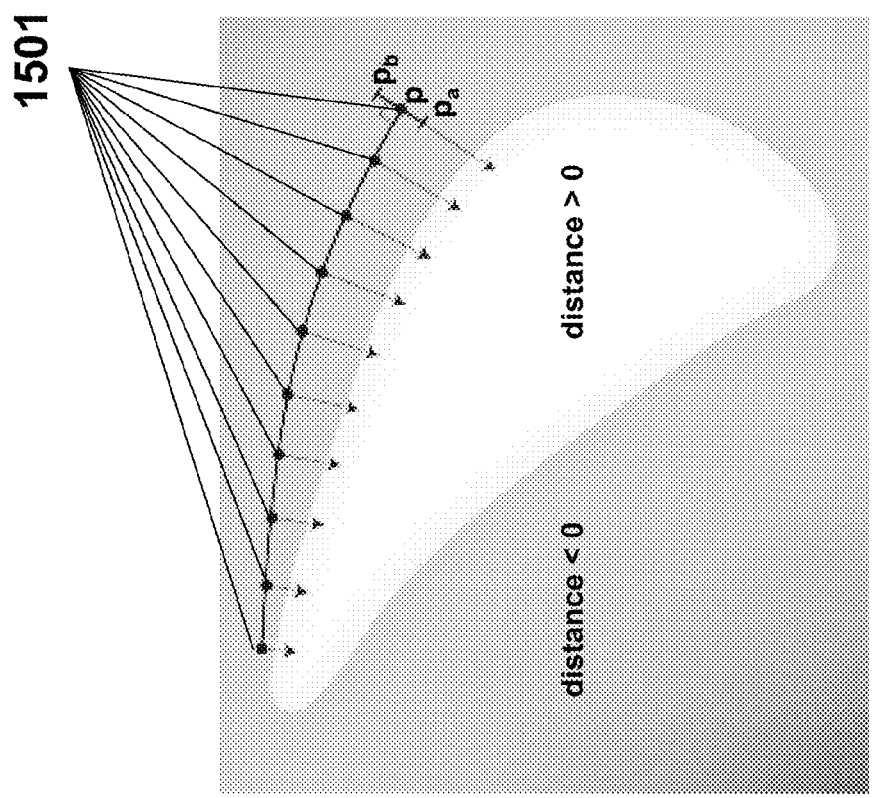
FIG. 15 is an illustration of a method for determining energy and force at sample points along an SSF centerline according to embodiments of the invention.

As shown in FIG. 15, regularly spaced sample points 1501 along each SSF centerline are used to determine how to modify the SSF stroke to match the corresponding implied stroke of the outline character. The signed distance values at the sample points 1501 indicate whether the sample points 1501 lie inside or outside the outline character, as well as the distance to the closest point on the character edge, thereby providing clues on how the SSF centerline should be moved to reach the centerline of the corresponding implied stroke of the outline character.

Because the distance field of the outline character varies smoothly, this approach is relatively robust to sampling locations and frequency. After an SSF stroke is in place, the SSF centerline lies along an area of the distance field of the outline character where the gradient is zero. In addition, the edges of the SSF body and terminals lie along the zero-level isosurface of the distance field of the outline character.

Conversion Method

Figure 7:
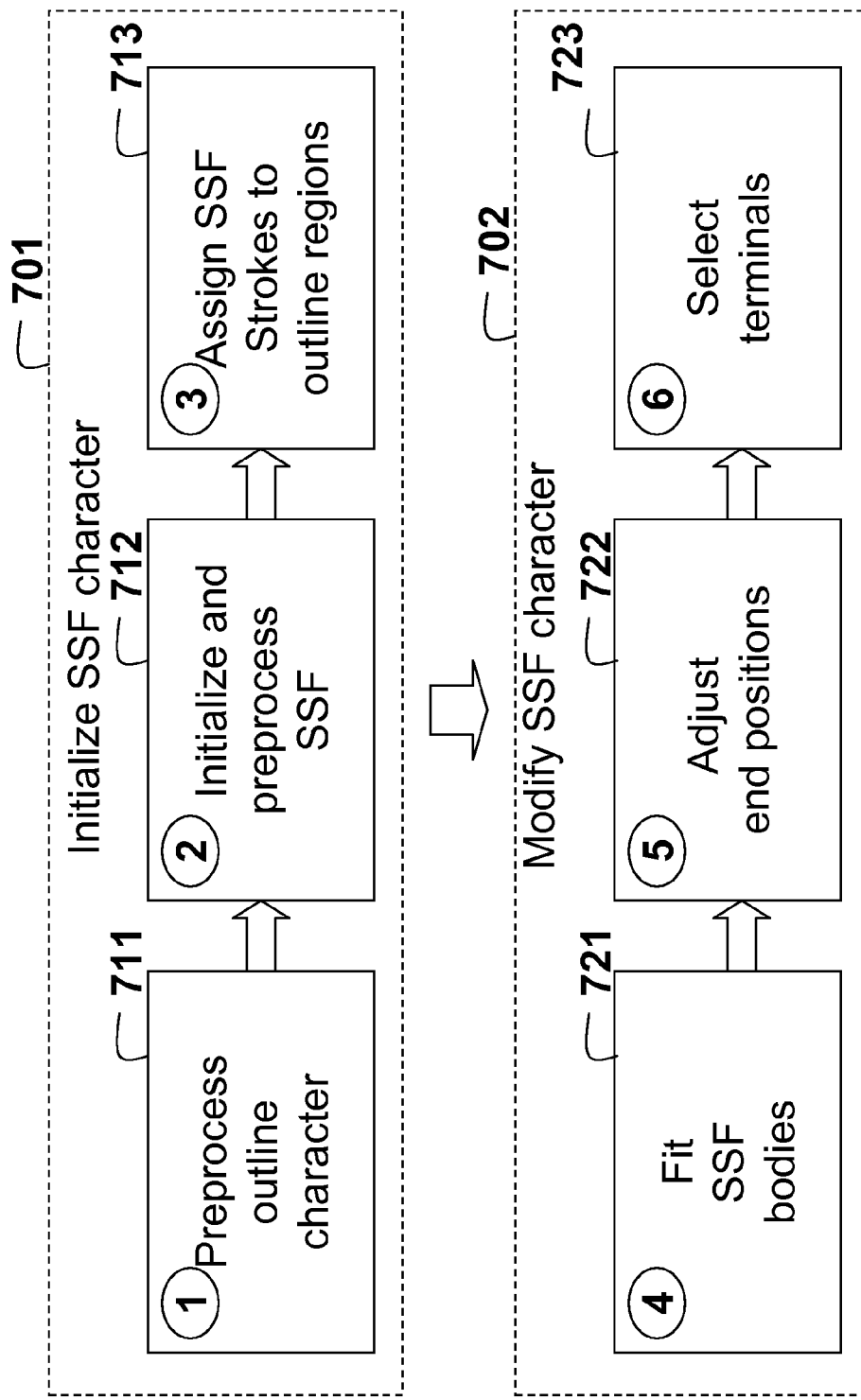
FIG. 7 is a flow diagram of a method for converting an outline character to a stylized stroke character according to embodiments of the invention.

As shown in FIG. 7, the method for converting an outline character to a stylized stroke character (i.e., an SSF character) has two stages 701-702. During the first stage 701, a stylized stroke character is initialized, after which character shape and structure information is computed for both the stylized stroke character and the outline character. During the second stage 702, the shape and structure information is used to iteratively modify the stylized stroke character to match the outline character.

There are three steps in each stage: Step 1—preprocessing the outline character 711, Step 2—initializing and preprocessing the stylized stroke character 712, Step 3—identifying a correspondence between SSF strokes and closed, disjoint regions of the outline character 713, Step 4—modifying the SSF strokes to match the implied strokes of the outline character 721, Step 5—adjusting end positions of the SSF strokes 722, and Step 6—selecting terminals for the SSF strokes 723.

Step 1—Preprocessing the Outline Character

Figure 8B:
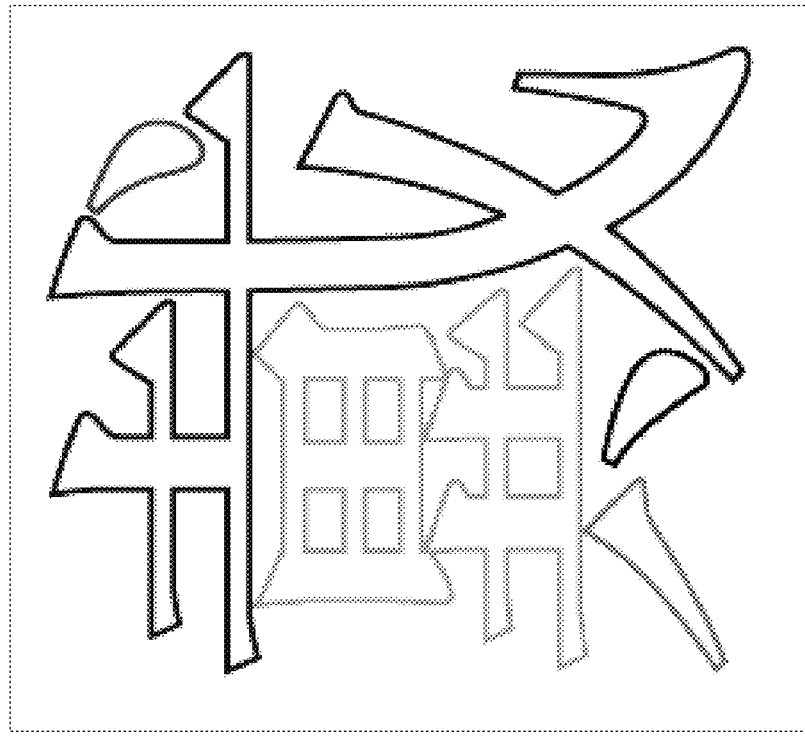
FIG. 8B is the Chinese character of FIG. 8A represented with closed contours that delineate closed, disjoint regions of the outline character according to embodiments of the invention.
Figure 8A:
FIG. 8A is Chinese character represented with an outline font.

The outline character to be converted, as depicted in FIG. 8A, is represented by a series of closed contours which delineate closed, disjoint regions. Step 1 identifies the closed and disjoint regions of the outline character. Next, the signed sampled distance field is determined for each region. Each region is analyzed to determine candidate locations for stroke bodies and terminals using the well known Delaunay triangulation of a densely sampled line segment approximation of the contours defining the region, see FIG. 9A.

A Delaunay triangulation contains three types of triangles—junction triangles, terminal triangles, and sleeve triangles. The types are differentiated by the number of edges shared between the triangle and the line segment approximation, see FIG. 9B.

Recall, the shape of an outline region is the composite shape of the implied strokes defining that region, see FIG. 5C. Therefore, each type of triangle corresponds to a possible part of an implied stroke. A junction or terminal triangle indicates a change in shape. Therefore, the circumcircles of junction and terminal triangles are used as candidate areas, represented as circles, for intersections, corners and junctions, e.g., T-junctions, between implied strokes, and for implied stroke ends, see FIG. 9C. A sleeve triangle indicates slowly varying or constant shape and may correspond to the body of a single implied stroke.

Figure 9D:
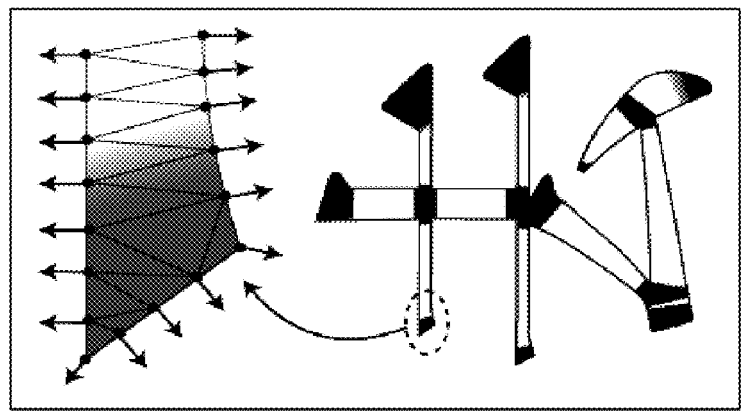
FIGS. 9A-9D are Chinese characters with applied line segmentation, triangulation, junction, and masking operations according to embodiments of the invention.
Figure 9C:
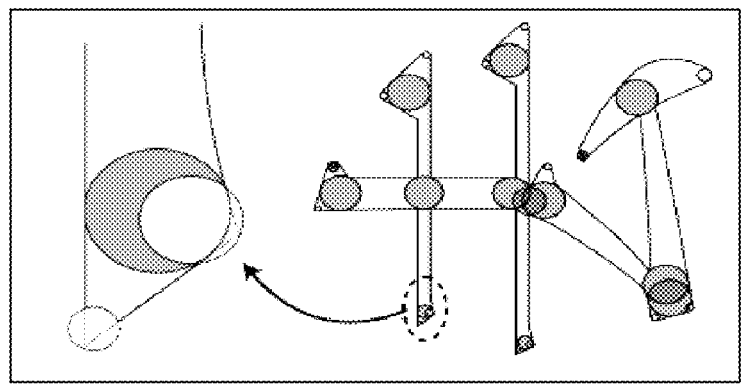
Figure 9B:
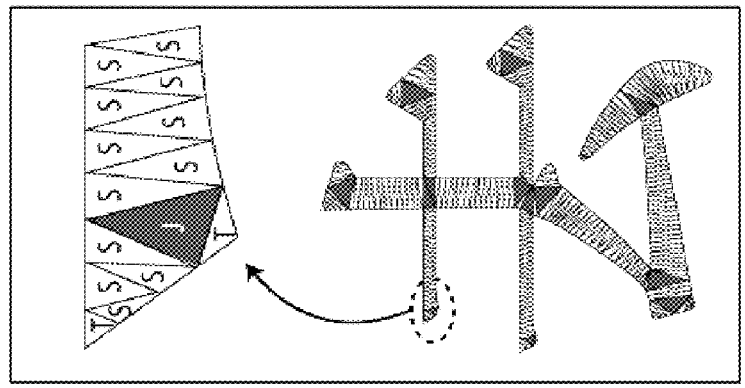
Figure 9A:
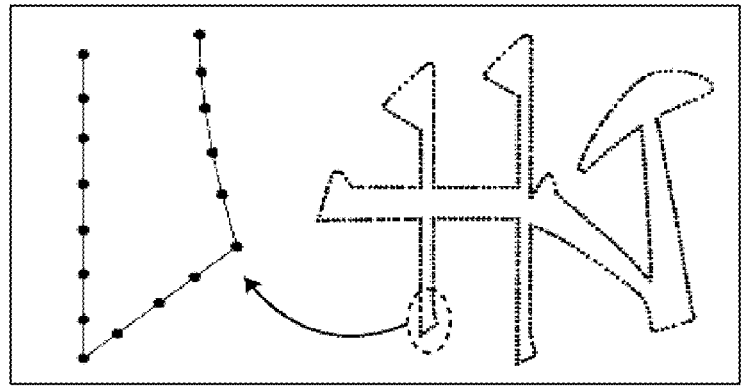

The method determines a weighted mask using the vertices of the Delaunay triangulation, see FIG. 9D. Each sample point of the mask is assigned a likelihood that the sample point lies in the body of a single implied stroke of the outline region.

The mask is determined as follows. Each vertex v in the Delaunay triangulation is assigned a weight between 0 and 1. A vertex that belongs to a junction or terminal triangle always has a weight of 0. Each remaining vertex v has a weight based on the dot product of its normal and the normal of each vertex u with which vertex v shares an edge: weight(v)=1−min$\{N_u \cdot N_v\}$/2, where $N_u$ and $N_v$ are the normals to the outline contour at vertices u and v, $N_u \cdot N_v$ is the dot product of $N_u$ and $N_v$, and min$\{N_u \cdot N_v\}$ is the minimum value of $N_u \cdot N_v$ across all edges e=(u, v) extending from v. The mask is determined by interpolating weights between vertices.

Step 2—Initializing and Preprocessing the SSF Character

The stylized stroke character is initialized using the corresponding character from a uniform width stroke font. The SSF centerlines are initialized using the paths of the corresponding uniform width stroke character. The SSF profiles are initialized to a constant value. The SSF stroke bodies are initialized to have no terminals. Note that paths with corners are partitioned to form multiple SSF stroke bodies.

The strokes of the stylized stroke character form one or more non-overlapping stroke sets. SSF strokes within each stroke set have specific relationships to one another which are used to define subsets of SSF stroke sets.

Figure 10:
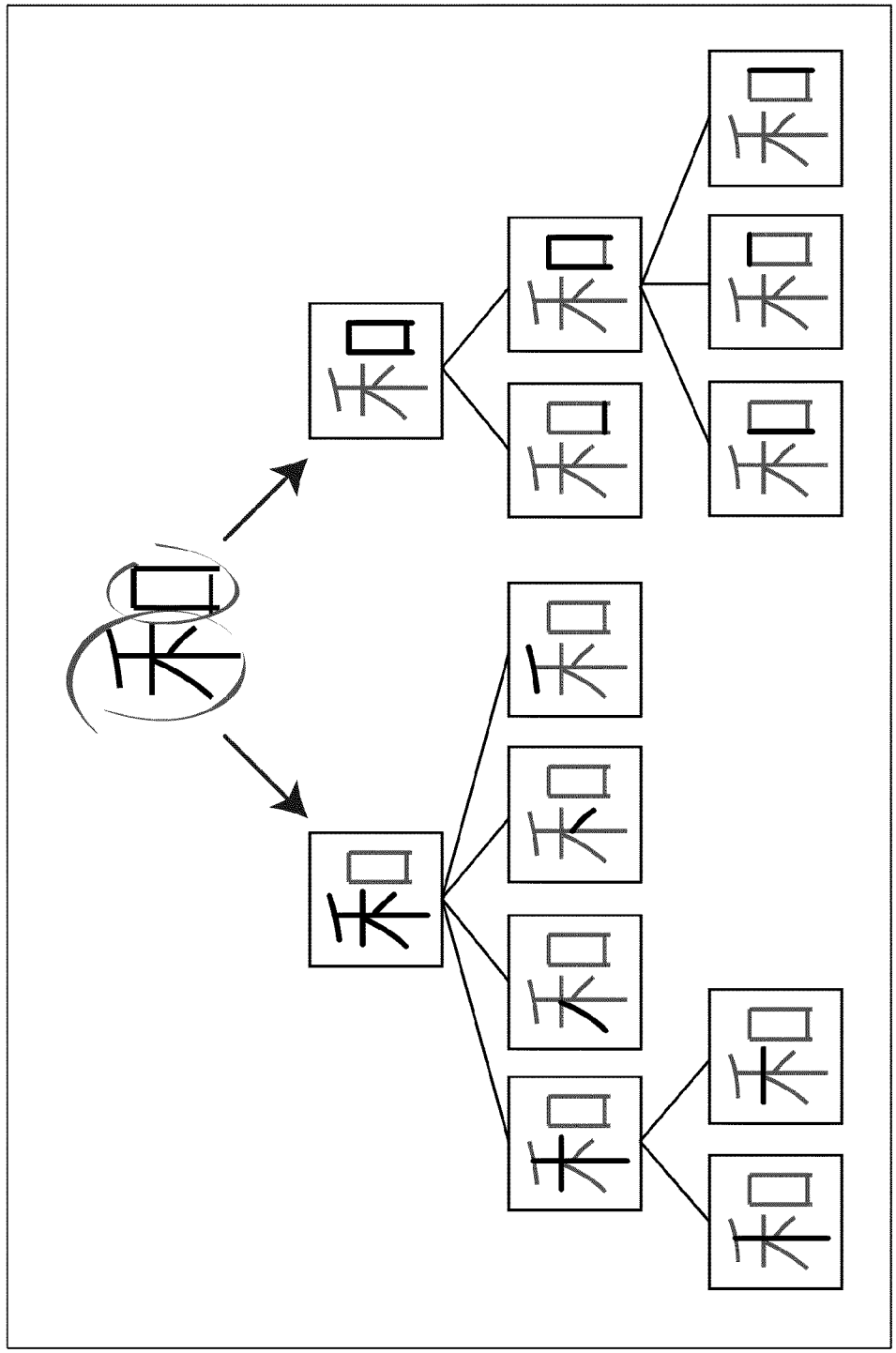
FIG. 10 is a hierarchical tree representation of a Chinese character according to embodiments of the invention.

Step 2 organizes the SSF strokes from each non-overlapping stroke set into a hierarchy tree of these subsets, see FIG. 10. As shown in FIG. 10, the strokes of an SSF glyph can be partitioned into independent non-overlapping stroke sets. Each stroke set constitutes a hierarchy of subsets, reflecting the relationship between SSF strokes. FIG. 10 shows two such stroke sets for the depicted glyph. Each hierarchy is represented by a tree data structure, with leaf nodes representing individual SSF strokes, intermediate nodes representing SSF stroke subsets (SSF strokes that were initially part of the same path or SSF strokes or subsets of SSF strokes that cross each other), and the root node representing all the SSF strokes in the stroke set.

Step 3—Assigning Sets of SSF Strokes to Outline Regions

Figure 11C:
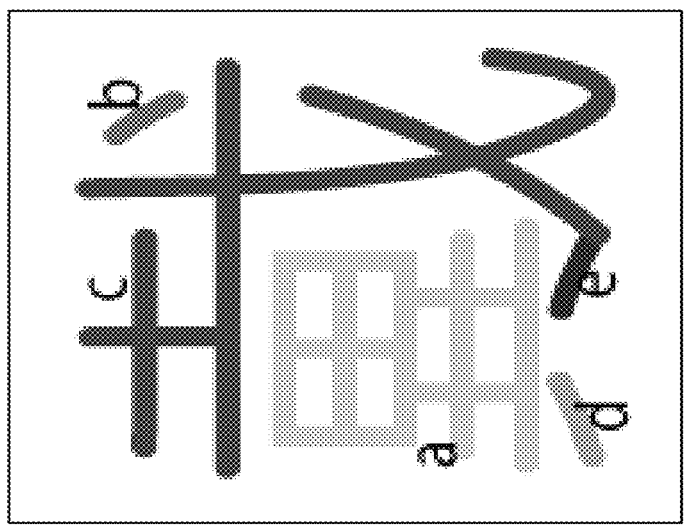
FIGS. 11A-11C are Chinese characters with strokes assigned according to embodiments of the invention.
Figure 11B:
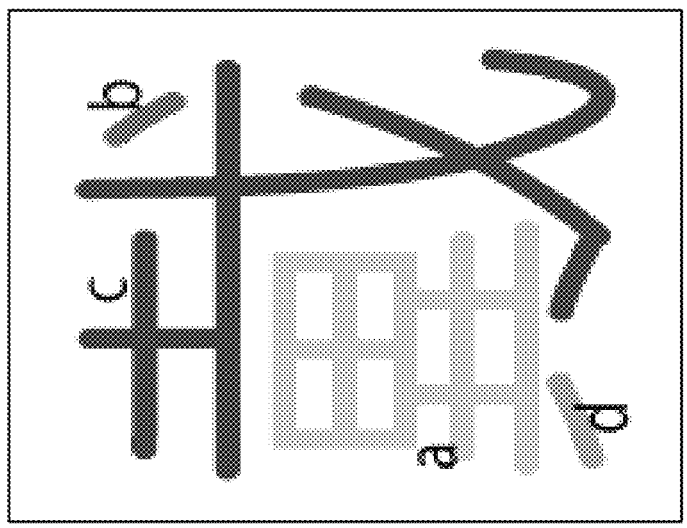
Figure 11A:
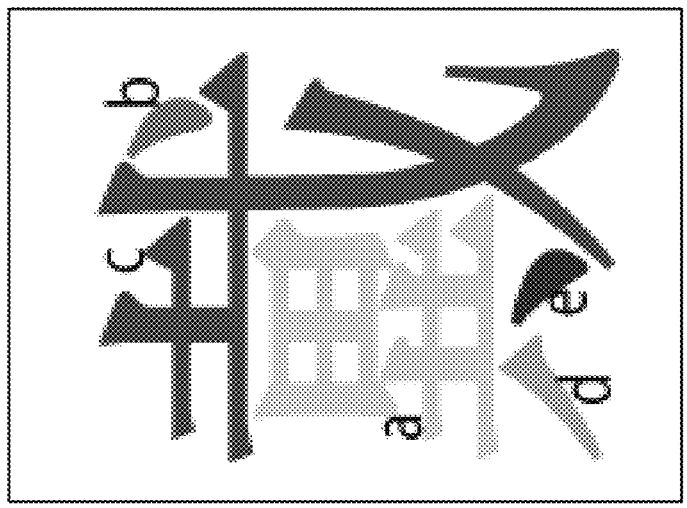

Step 3 determines which SSF stroke sets correspond to each outline region, see FIGS. 11A-11C. The SSF glyph is transformed to map its axis-aligned bounding box onto the axis-aligned bounding box of the corresponding outline glyph. Using the distance fields of the outline regions, each SSF stroke set is then assigned to its closest outline region. If an outline region is not assigned to an SSF stroke set, then a nearby SSF stroke subset or SSF stroke is reassigned to it. The SSF stroke subset or SSF stroke (which is not part of an SSF stroke subset) that is closest to the outline region is reassigned to that outline region.

To illustrate Step 3, an example is given in FIGS. 11A-11C. Step 3 determines the SSF stroke sets that correspond to each outline region (a-e). Initially, each SSF stroke set (see FIG. 11B) is assigned to the outline region to which it is closest, see FIG. 11A. If an outline region has no assigned SSF stroke set, e.g., outline region e, then the SSF stroke set containing the SSF stroke closest to the region, e.g., SSF stroke set c, is split between the outline region with no SSF strokes (outline region e) and the outline region to which the SSF stroke set was initially assigned (outline region c).

Step 4—Fitting SSF Bodies

In Step 3, assigning sets of SSF strokes to outline regions, one or more SSF stroke sets were assigned to each outline region. Recall that the shape of each outline region is the composite shape of the implied strokes defining that region.

In Step 4, the bodies of the strokes in each SSF stroke set are modified to match the bodies of the implied strokes in their corresponding outline region. The method treats each outline region and its corresponding strokes independently.

The SSF strokes corresponding to the outline region are initially transformed so that the union of their bounding boxes is aligned with the bounding box of the outline region. Each SSF stroke is then modified, as described below, using the distance field of the outline region to match its body to the body of the corresponding implied stroke in the outline region.

Energy and Force

Ultimately, each SSF centerline of the stroke body is aligned to the centerline of the stroke body of a corresponding implied stroke of the outline character. The alignment of the SSF centerline is quantified using an energy that reflects how the distance field of the outline region changes across the SSF centerline. The SSF centerline is iteratively modified by applying forces along the SSF centerline to reduce the energy, causing the SSF centerline to approach the centerline of its corresponding implied stroke.

As shown in FIG. 15, the energy of an SSF centerline is the average of the energy at equally spaced sample points 1501 along the SSF centerline. The energy at a point p is computed using the distance at p and at two points, $p_a$ and $p_b$, offset from p by a small step in each direction normal to the SSF centerline at p: Energy$_{CNTR}$(p)=|Distance($p_a$)−Distance($p_b$)|*(C−Distance(p)), where C is a constant that is larger than the maximum value of Distance(p) so that (C−Distance(p))>0. Ideally, C equals the maximum value of the distance field of the outline region so that (C−Distance(p)) is small when p is near the centerline of the implied stroke.

When the distance field of the outline region is symmetric across the SSF centerline (when |Distance($p_a$)−Distance($p_b$) |=0), the energy is zero. When the distance field of the outline region is not symmetric across the SSF centerline, the energy decreases as the SSF centerline approaches the implied centerline of the outline region.

Forces at sample points along the SSF centerline are used to modify the SSF centerline so as to reduce its energy. Each force is normal to the SSF centerline and points in the direction of increasing distance. The magnitude of the force is proportional to the energy of the SSF centerline at the sample point p: F(p)=$N^+$*Energy$_{CNTR}$(p)*STEP_SIZE, where $N^+$ is the normal of the SSF centerline at p pointing in the direction of increasing distance and STEP_SIZE is user defined.

Each force has an associated weight from the mask determined in Step 1, preprocessing the outline character, which reflects the likelihood that its sample point lies in a region corresponding to the body of the implied outline stroke.

Modifying SSF Bodies

The SSF strokes corresponding to the outline region are iteratively modified in an order of the hierarchical tree structure. The SSF stroke sets corresponding to the outline region are placed into a tree structure T where each SSF stroke set is a child of the root node of T, see FIG. 10.

First, all the SSF strokes, i.e., all the strokes contained in the root node of T, are modified as a single unit. When the change in the centerline energy between successive iterations is small, each SSF stroke set, i.e., each child of the root node of T, is then modified independently. The hierarchy of FIG. 10 is descended in order until eventually each SSF stroke, i.e., each leaf node of T, is modified independently.

The manner in which the SSF bodies are modified changes as the SSF centerlines approach the centerlines of their corresponding implied strokes.

Initially, affine transformations are used to coarsely shape and position the SSF centerlines. The force at each sample point defines a desired location for that sample point. A weighted least squares solver is used to compute the affine transformation that minimizes the sum of the squared distances of the sample points from their desired locations for all the SSF strokes contained in the current node. The affine transformation is then applied to the control vertices of the SSF centerlines to update their position and shape.

After all the SSF strokes corresponding to the outline region have been transformed independently and the change in their centerline energy is smaller than a predetermined threshold, the method proceeds to fine tune each SSF body.

Figure 12A:
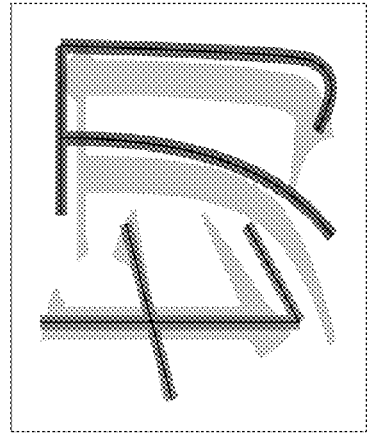
FIGS. 12A-12F are Chinese characters with steps of the method of FIG. 7 applied according to embodiments of the invention.
Figure 12B:
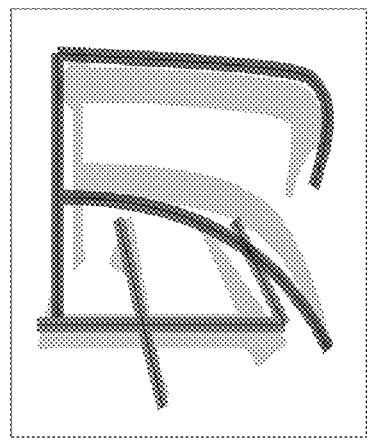
Figure 12C:
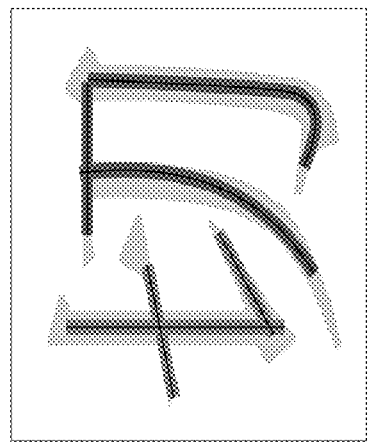
Figure 12D:
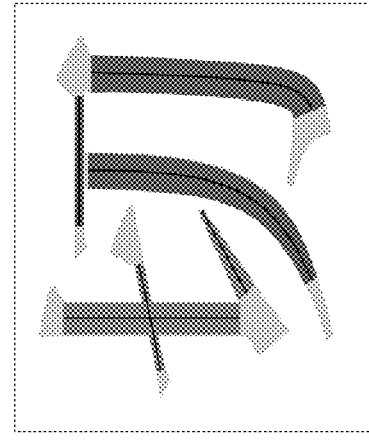

Three properties of the SSF body, i.e., the shape of the SSF centerline, the length of the SSF body, and the shape of the SSF profile, are iteratively modified so that the shape of the SSF body matches the shape of the body of its corresponding implied stroke, see FIG. 12D.

The shape of each SSF centerline is modified using a distance-based curve fitting procedure. As described above, the forces are computed for a set of sample points along the centerline and weighted with the mask determined in Step 1, preprocessing the outline character. These sample point forces are then combined and applied to reposition the control vertices defining the centerline, thereby modifying the shape of the centerline.

In particular, each control vertex is moved by a small step in the direction of a weighted sum of the sample point forces. The weights of the weighted sum are related to the coefficients of the well known Bernstein polynomials, which define each portion of the centerline.

For example, the weights for sample points p(t) along a quadratic Bezier curve defined by p(t)=$(1-t)^2 C_1 + 2t(1-t)C_2 + t^2 C_3$, where t ∈ [0, 1], are $(1-t)^2$ for control vertex $C_1$, $2t(1-t)$ for control vertex $C_2$, and $t^2$ for control vertex $C_3$.

SSF stroke bodies are lengthened and shortened based on a series of predicate tests that determine how well the end of the SSF body fits the region in which it lies.

If (1) the end of the SSF body lies outside its corresponding outline region, (2) the end of the SSF body lies inside another SSF body, (3) the end of the SSF centerline is not aligned to its corresponding implied centerline, or (4) the shape along the end of the SSF body does not match the shape along the end of the implied stroke, then the SSF stroke is shortened.

Otherwise, the stroke is lengthened.

The shape of an SSF body is adjusted by updating its profile 402 using a weighted linear least squares method to fit a quadratic Bezier curve to the sample point distances along the SSF centerline. The weights reflect how well the sample point distances correspond to the stroke width at the sample points. The weights are determined as follows.

When the SSF centerline 401 is perfectly aligned with the centerline of its corresponding implied stroke, the distance Distance(p) at a centered sample point p, e.g., a sample point lying on its corresponding implied centerline in a region that does not correspond to an intersection of implied strokes, indicates the stroke width Width(p) at that sample point.

Each sample point p has two associated offset points, $p_a$ and $p_b$, offset from p by Width(p) in each direction normal to the SSF centerline at p. When p is centered, $p_a$ and $p_b$ lie on the zero-level iso-surface of the distance field of the outline region. When this occurs, the distance is zero at $p_a$ and $p_b$ and the gradient of the distance field at $p_a$ and $p_b$ is approximately normal to the centerline at p.

Using the distance and gradient at $p_a$ and at $p_b$, a weight is computed at each sample point p. The weight indicates whether p is centered. The difference between the distance field gradient and the corresponding centerline normal at each offset point is scaled by the distance at the offset point.

Step 5—Adjusting End Positions of the SSF Bodies

In Step 4, fitting SSF bodies, SSF bodies were forced to contract out of areas in which they did not fit (FIG. 12D), even though these areas may have corresponded to the bodies of implied strokes. For example, an SSF body may have contracted because its end was lying in an area corresponding to a junction of two implied strokes.

Figure 12E:
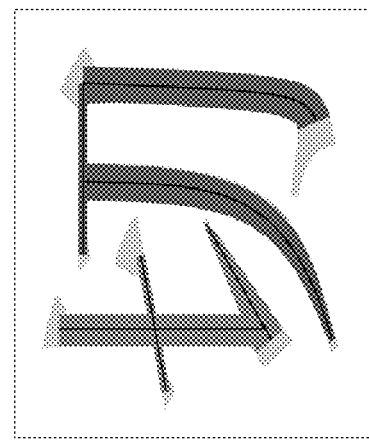

In order to preserve the topology of the outline character, SSF bodies that should form corners or junctions are explicitly connected and ends of SSF bodies not connected to other SSF bodies need to be positioned in areas of the outline region that correspond to terminals (FIG. 12E). The connecting and extending of end positions of the SSF bodies are herein referred to as adjusting SSF bodies. The set of candidate areas for the ends, junctions, and corners of implied strokes indicate how to connect and position (i.e., adjust) the ends of SSF bodies.

Each SSF centerline is extended in turn towards the next candidate area along its path so that the end of the SSF centerline is as close as possible to the center of the candidate area. Three rules are used to determine when to stop extending the SSF centerline.

First, if the end of the SSF centerline runs into another SSF centerline, the SSF centerline is only allowed to continue extending if there is an area of the outline region opposite the end of the SSF centerline, e.g., on the other side of the crossing SSF stroke, which is not covered by any SSF stroke.

Second, if the end of the SSF body encounters an area (before it reaches the next candidate area) where its shape does not match the shape of the body of its corresponding implied stroke, the SSF centerline is reset to its previous position.

Third, if the end of the SSF centerline reaches the circle representing the next candidate area but its distance to the edge of that circle is less than the distance to the edge of the circle representing its previous candidate area, then the SSF centerline is reset to its previous position.

After the SSF centerlines have stopped advancing, junctions and corners may need to be explicitly formed for ends of SSF centerlines that lie in candidate areas containing other SSF centerlines. The end of each SSF centerline is considered in turn.

If the end of the SSF centerline lies in a candidate area containing a portion of another SSF centerline, a junction or corner is formed: (1) A corner is formed if the end of the SSF centerline lies in a circle containing the end of another SSF centerline and either both SSF centerlines need to be further extended to connect or the distance between the ends of the SSF centerlines is less than the size of the SSF profile at both SSF centerline ends; 2) A junction is formed otherwise.

Step 6—Selecting SSF Terminals

Figure 12F:
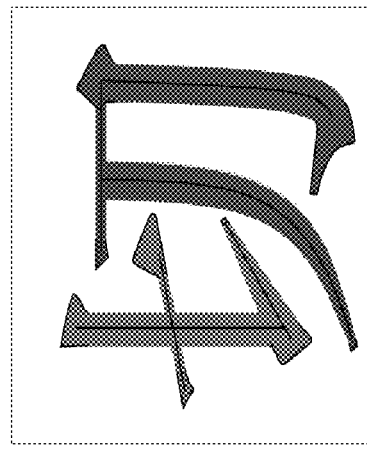
Figure 13:
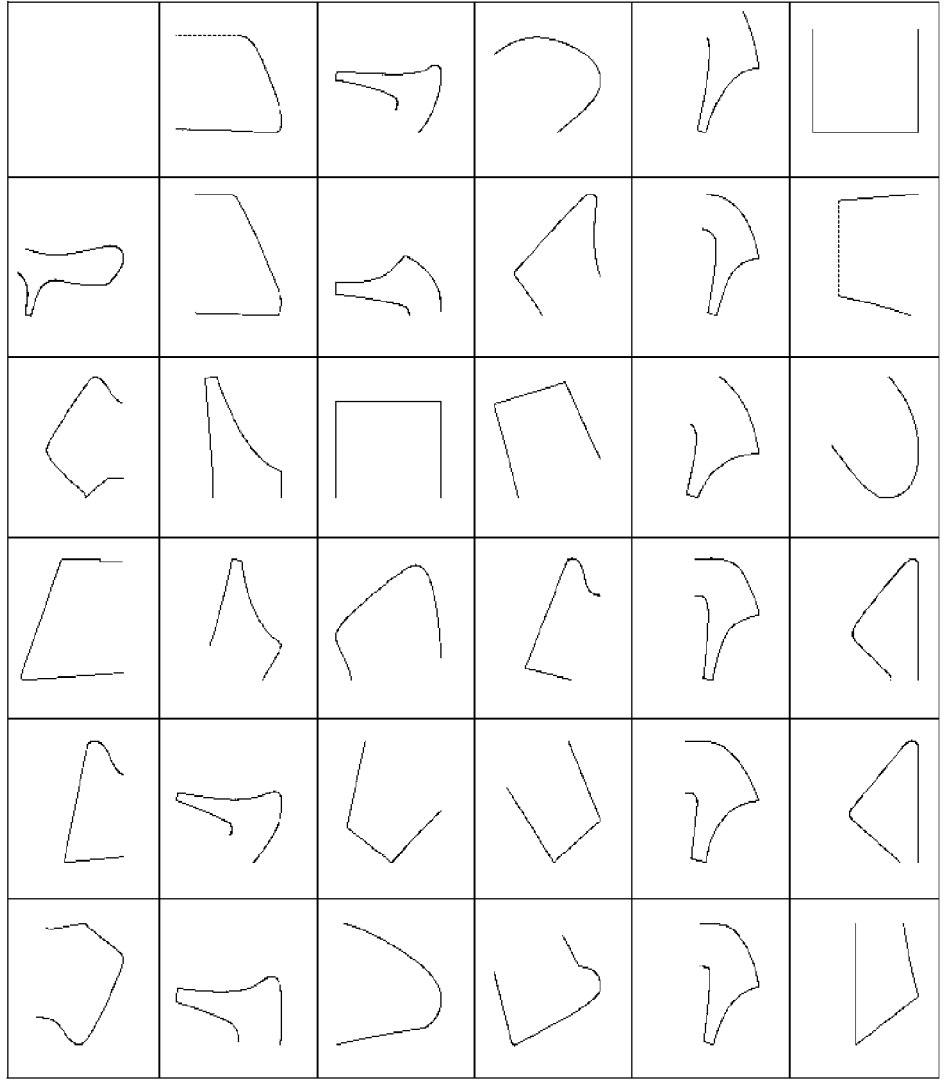
FIG. 13 is a set of terminals according to embodiments of the invention.

SSF terminals are selected (FIG. 12F) from a set of terminals 1300 shown in FIG. 13. The terminals are predetermined interactively by examining a small set of sample characters in the outline font. Each SSF terminal has an associated user-defined maximum allowable rotation and scale for fitting the SSF terminal to the SSF body. The path defining the SSF terminal should lie on the zero-level iso-surface of the distance field of the outline region. When this occurs, at any point p along the path, the value of the distance field of the outline region is zero at p, and the gradient of the distance field is normal to the terminal path at p.

Figure 14:
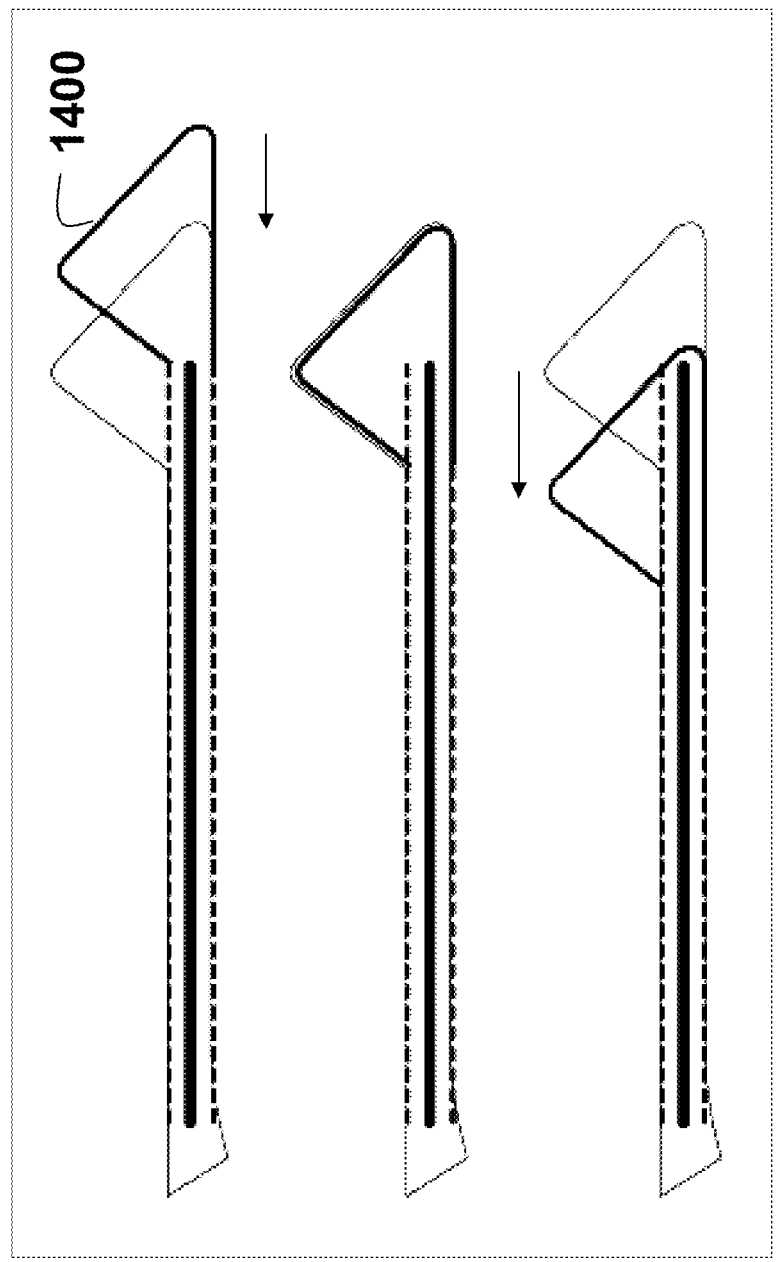
FIG. 14 is a stroke with a terminal fitted according to embodiments of the invention.

As shown in FIG. 14, the best terminal 1400 for an SSF stroke and its position along the stroke are determined by placing each SSF terminal in the set at the end of the SSF body and then sliding it along the SSF body while measuring its fit.

The orientation and size of the SSF terminal are updated as the SSF terminal is transformed, i.e., translated, rotated, and scaled, so that its opening is perpendicular to the SSF centerline and aligns to the edges of the SSF body. The fitting error of the terminal is measured using the distance field and the gradient of the distance field at equally spaced sample points along the SSF terminal path.

The error is the average of the error at the sample points along the SSF terminal path: $\text{Error}_{TERM}(p) = \|\text{Normal}(p) - \text{Gradient}(p)\| * |\text{Distance}(p)|$.

SSF terminals that exceed either the maximum scale or rotation at a specific location are disregarded for that location. Locations where the SSF centerline end extends outside of the SSF terminal are also discarded. This prevents SSF terminals from sliding too far along the SSF body. The ends of SSF bodies that form junctions do not have terminals. The ends of SSF bodies that form corners use only the SSF terminal of the SSF stroke end with the better fitting terminal.

Summary of Steps 1-6

FIGS. 12A-12F show a summary of the method steps according to the invention. FIG. 12A shows how initially the stylized stroke character is transformed to map its axis-aligned bounding box to the axis-aligned bounding box of the outline character. After SSF stroke sets have been assigned to outline regions (FIG. 12B), the strokes corresponding to each outline region are transformed so that the union of their bounding boxes is aligned to the bounding box of the outline region.

Affine transformations are used to coarsely shape and position the SSF centerlines to match the centerlines of their corresponding implied strokes (FIG. 12C). SSF profiles are determined, SSF stroke lengths are adjusted, and SSF centerlines are bent in order to improve the match between the SSF strokes and their corresponding implied strokes (FIG. 12D). Using the set of candidate areas for stroke corners, junctions, intersections, and ends, SSF centerlines are connected or extended into regions corresponding to implied stroke terminals (FIG. 12E). Terminals are selected for the SSF strokes (FIG. 12F).

Extensions

Our automatic conversion method accommodates numerous extensions and variations such as: (1) the profile 402 can be represented as a piecewise continuous path of line segments and Bezier curves, rather than a single quadratic Bezier curve; (2) the profile 402 can consist of a left profile and a right profile rather than a single profile thereby enabling the conversion process to better match the target outline character; (3) the distance field can be represented in various ways such as a sampled distance map, an adaptively sampled distance field (ADF), a procedure, or a set of distance values stored in a memory, to name but a few; (4) bipartite matching methods can be used for improving the process of matching SSF strokes to regions.

Operating Environment

The invention is operational with numerous general purpose or special purpose computing system environments or configurations. Examples of well known computing systems, environments, and/or configurations that are suitable for use with the invention include, but are not limited to, personal computers, server computers, handheld or laptop devices, multiprocessor or multi-core systems, graphics processing units (GPUs), application-specific integrated circuits (ASICs), field programmable gate arrays (FPGAs), microcontroller-based systems, set top boxes, programmable consumer electronics, network PCs, minicomputers, mainframe computers, distributed computing environments that include any of the above systems or devices, and the like.

Effect of the Invention

The method for automatic conversion was tested on 2,484 of the Chinese Government's Ministry of Education's list of 2,500 Frequently Used Words. This set of characters was selected because the variation of its character shapes are representative of the entire Chinese character set.

Test results demonstrate that the converted characters have no visible differences at 70 ppem, and 88% of the characters have no visible differences at 30 ppem. The converted characters are nearly identical to the target outline characters, particularly at small point sizes, and the resulting font has a significantly smaller memory footprint, e.g., one tenth of the outline font. This order of magnitude reduction in memory requirements is significant.

An error for each stylized stroke character is measured using the average of the squared differences between the distance field of the stylized stroke character and the distance field of the corresponding outline character. This error measure enables identification of poorly converted characters for automatic correction.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for converting an outline character to a stylized stroke character, comprising a processor for performing the method, the method comprising the steps of:
   identifying regions of the outline character, wherein each region is closed and disjoint;
   determining, for each region, candidate locations for stroke bodies and terminals;
   initializing the stroke bodies of the stylized stroke character;
   organizing the stroke bodies into a hierarchical tree structure;
   modifying the stroke bodies in an order of the hierarchical tree structure to produce modified stroke bodies;
   adjusting end positions of the modified stroke bodies so that adjusted stroke bodies match the outline character; and
   selecting the terminals for the adjusted stroke bodies.

2. The method of claim 1, wherein each region is represented with a distance field, and the determining uses Delaunay triangulation of a densely sampled line segment approximation of contours defining the region.

3. The method of claim 2, wherein the stroke bodies have a uniform width, and a centerline of the stroke bodies uses a path of a corresponding uniform width stroke character, and the paths with corners are partitioned to form multiple stroke bodies.

4. The method of claim 1, wherein the stroke bodies are modified and adjusted for each region independently.

5. The method of claim 3, further comprising:
   aligning the centerline of each stroke body to a centerline of a corresponding implied stroke of the outline character.

6. The method of claim 5, wherein the aligning is quantified using an energy that reflects how the distance field of the region changes across the centerline of each stroke body.

7. The method of claim 6, wherein the centerline of each stroke body is iteratively modified by applying forces along the centerline to reduce the energy, and causing the centerline of each stroke body to approach the centerline of the corresponding implied stroke of the outline character.

8. The method of claim 7, wherein the energy is an average of the energy at equally spaced sample points along the centerline of each stroke body.

9. The method of claim 7, wherein the energy is reduced until a change in energy is smaller than a predetermined threshold.

10. The method of claim 5, wherein the aligning uses affine transformations.

11. The method of claim 1, wherein each terminal is translated, rotated, and scaled, so that an opening of the terminal is perpendicular to the centerline of a particular stroke body and aligned to edges of the particular stroke body.

12. The method of claim 1, further comprising:
   measuring a difference between a distance field of the outline character and a distance field of the stylized stroke character to identify a conversion error.

13. The method of claim 1, wherein the adjusting further comprises:
   connecting and extending the modified stroke bodies to match the outline character.

* * * * *